US012037839B2

(12) United States Patent
Oakes et al.

(10) Patent No.: US 12,037,839 B2
(45) Date of Patent: Jul. 16, 2024

(54) SLIDING DOOR WITH BRAKING SYSTEM

(71) Applicant: Taylor Made Group, LLC, Gloversville, NY (US)

(72) Inventors: Philip A. Oakes, Middle Grove, NY (US); Edward J. Erskine, Benson, NY (US); Todd Vincent, Gloversville, NY (US)

(73) Assignee: TAYLOR MADE GROUP, LLC, Gloversville, NY (US)

(*) Notice: Subject to any disclaimer, the term of this patent is extended or adjusted under 35 U.S.C. 154(b) by 0 days.

(21) Appl. No.: 17/951,174

(22) Filed: Sep. 23, 2022

(65) Prior Publication Data

US 2023/0088843 A1 Mar. 23, 2023

Related U.S. Application Data

(60) Provisional application No. 63/247,372, filed on Sep. 23, 2021.

(51) Int. Cl.

| | |
|---|---|
| ***E06B 3/92*** | (2006.01) |
| ***E05D 15/06*** | (2006.01) |
| ***E05D 15/08*** | (2006.01) |
| ***E05F 5/00*** | (2017.01) |
| ***E05F 15/665*** | (2015.01) |
| ***E06B 3/46*** | (2006.01) |

(52) U.S. Cl.

CPC .......... *E06B 3/922* (2013.01); *E05D 15/0626* (2013.01); *E05D 15/0634* (2013.01); *E05D 15/08* (2013.01); *E05F 5/003* (2013.01); *E05F 15/665* (2015.01); *E06B 3/4636* (2013.01); *E05D 15/063* (2013.01); *E05D 15/0652* (2013.01); *E05D 15/0656* (2013.01); *E05Y 2201/21* (2013.01); *E05Y 2201/232* (2013.01); *E05Y 2201/684* (2013.01); *E05Y 2900/132* (2013.01); *E05Y 2900/148* (2013.01); *E05Y 2900/514* (2013.01)

(58) Field of Classification Search

CPC ......... E06B 3/922; E06B 3/469; E05D 15/08; E05D 15/12; E05D 2015/1026; E05Y 2201/21

USPC ............................................ 49/15, 127, 130

See application file for complete search history.

(56) References Cited

U.S. PATENT DOCUMENTS

| | | | |
|---|---|---|---|
| 2,909,802 A | 10/1959 | Gang et al. | |
| 4,241,686 A | 12/1980 | Westphalen | |
| 4,464,863 A * | 8/1984 | Chikaraishi | E05D 15/1047 49/213 |
| 4,833,829 A | 5/1989 | Wilson | |

(Continued)

*Primary Examiner* — Marcus Menezes
(74) *Attorney, Agent, or Firm* — NIXON & VANDERHYE P.C.

(57) ABSTRACT

A sliding door assembly includes a door frame with a top trim member, a bottom sill, and side jambs connected between the top trim member and the bottom sill, and a primary sliding panel secured in the door frame. The top trim member includes a track configured to support a weight of the primary sliding panel and prevent the primary sliding panel from coming off the track. Other features include an interlock mechanism to limit relative movement using multiple sliding doors and a brake mechanism to secure the doors in position when the door handle is released. A drop window includes features to accommodate for manufacturing tolerances and box frame assemblies that are out of square.

18 Claims, 16 Drawing Sheets

(56) References Cited

U.S. PATENT DOCUMENTS

| | | | | |
|---|---|---|---|---|
| 4,888,915 | A * | 12/1989 | Goldenberg | E05D 15/22 49/181 |
| 5,163,204 | A | 11/1992 | Jackson | |
| 5,224,297 | A | 7/1993 | Watkins | |
| 6,131,340 | A | 10/2000 | Clark et al. | |
| 7,401,566 | B1 | 7/2008 | Miknich | |
| 10,246,163 | B2 | 4/2019 | Erskine et al. | |
| 2006/0137252 | A1 * | 6/2006 | Kriese | E05F 15/40 49/360 |
| 2007/0068435 | A1 | 3/2007 | Martin | |
| 2017/0130504 | A1 | 5/2017 | Westgarth et al. | |
| 2017/0204644 | A1 * | 7/2017 | McMullen, Jr. | E06B 3/5072 |
| 2017/0247928 | A1 | 8/2017 | Haeussler et al. | |
| 2017/0342755 | A1 | 11/2017 | Whitehurst et al. | |
| 2018/0298666 | A1 | 10/2018 | Andersson et al. | |
| 2019/0039690 | A1 | 2/2019 | Erskine et al. | |
| 2019/0119966 | A1 | 4/2019 | Barbieri | |

* cited by examiner

SLIDING DOOR WITH BRAKING SYSTEM

CROSS-REFERENCES TO RELATED APPLICATIONS

This application claims the benefit of U.S. Provisional Patent Application No. 63/247,372, filed Sep. 23, 2021, the entire content of which is herein incorporated by reference.

STATEMENT REGARDING FEDERALLY SPONSORED RESEARCH OR DEVELOPMENT (Not Applicable)

BACKGROUND

The invention relates to a sliding door assembly and, more particularly, to a multi-panel sliding door system including a handle release braking system and a panel interlock arrangement.

Unlike sliding doors in a residential home, sliding doors in a marine environment are subjected to a multitude of external forces during use and operation. For example, when a boat is in use, forces from waves or weather or the like can cause a sliding door to come off its track. The same forces could cause sliding doors to open or close undesirably.

Existing designs are difficult to adjust, and/or adjustments cause the doors to become unstable. Unstable doors tend to rattle in use, which is undesirable.

In order to close off a large opening, it may be desirable to include multiple sliding doors in a single door assembly. An exemplary design may include one fixed panel and two sliding panels. A trim member on the outward door may engage a corresponding trim member on an inward door only when the outward door is fully closed. As the outward door is opened, the inward door is movable relative to the outward door and the fixed panel, which is undesirable. Once the outward door reaches the inward door, a bumper on the outward door will impact the inward door and push the inward door open. The lack of any connection between the doors as the outward door is being opened can result in undesirable contact between the doors and/or awkward door positions. Also, as the outward door is displaced, the inner door is released and can undesirably move.

SUMMARY

The door system of the described embodiments addresses several problems with existing constructions while also facilitating access to various moving parts for maintenance and repair. Framework for the door panels provides secure connections, rollers and sliders for smooth and secure operation. An interlock mechanism prevents a second sliding panel from being displaceable until engaging the first sliding panel in a max open position. Additionally, a brake system secures the doors in place regardless of a position of the doors once the handle is released. The systems of the described embodiments are equally applicable to door assemblies including three or more sliding panels.

In an exemplary embodiment, a sliding door assembly includes a door frame with a top trim member, a bottom sill, and side jambs connected between the top trim member and the bottom sill, a primary sliding panel secured in the door frame, and a secondary sliding panel secured in the door frame. An interlock mechanism locks the secondary sliding panel to the bottom sill until the primary sliding panel is displaced from a closed position to a first open position. The interlock mechanism locks the secondary sliding panel to the primary sliding panel when the primary sliding panel is displaced to and beyond the first open position to a second open position.

The interlock mechanism may be configured to detach the secondary sliding panel from the primary sliding panel and re-lock the secondary sliding panel to the bottom sill when the primary sliding panel is displaced from the second open position to the first open position and beyond the first open position to the closed position.

The interlock mechanism may include a first interlock cam block fixed to the primary sliding panel, a second interlock cam block fixed to the bottom sill, and an interlock assembly fixed to the secondary sliding panel. When the primary sliding panel is between the closed position and the first open position, the interlock assembly may be secured to the second interlock cam block and the secondary sliding panel may be fixed in place. In the first open position, the first interlock cam block may engage the interlock assembly, detach the secondary sliding panel from the second interlock cam block, and secure the interlock assembly to the first interlock cam block.

The interlock assembly may include an interlock cam and a pair of interlock triggers, and the interlock cam may include a first cam tab and a second cam tab. One of the interlock triggers engages the interlock cam when the primary sliding panel is between the closed position and the first open position to secure the first cam tab to the second interlock cam block. The one of the interlock triggers may be disposed in a path of the first interlock cam block such that in the first open position, the first interlock cam block engages the one of the interlock triggers and displaces the one of the interlock triggers from engagement with the interlock cam. In the first open position, the second cam tab may engage the first interlock cam block.

The interlock triggers may include an upper part and a lower part secured on a common pivot axis. The upper part may include a top trigger tab in the path of the first interlock cam block and a lock tab that selectively engages the interlock cam. The lower part may include a bottom trigger tab engageable with the second interlock cam block and a bottom lock tab that selectively engages the interlock cam. The assembly may further include a spring that biases the interlock triggers toward engagement with the interlock cam.

The assembly may further include a door handle cooperable with the primary sliding panel and a brake mechanism cooperable with the door handle, where the brake mechanism may be configured to hold the primary sliding panel in place until the door handle is actuated to disengage the brake mechanism. The brake mechanism may be configured to re-engage the brake mechanism when the handle is released.

In some embodiments, the brake mechanism may include a rod coupled with the handle and displaceable with the handle, a collar fixed to the rod and displaceable with the rod, a moving block disposed over the rod and engaging the collar, a brake slide fixed to the moving block and displaceable with the moving block, and a brake pad cooperable with the brake slide and displaceable by the brake slide between an engaged position and a disengaged position. The brake mechanism may further include a fixed block secured to the door frame, where the rod extends through the fixed block, and where the fixed block may be positioned above the moving block. A spring may be positioned between the fixed block and the moving block to bias the moving block toward a position in which the brake pad is in the engaged position. The brake mechanism may further include an H-bar pivotably coupled at one end to the brake slide and at an opposite end to a brake pivot arm, where the brake pad may be fixed to the brake pivot arm.

In another exemplary embodiment, a sliding door assembly includes a door frame with a top trim member, a bottom sill, and side jambs connected between the top trim member and the bottom sill. A primary sliding panel is secured in the door frame, and a secondary sliding panel is secured in the door frame. A door handle is cooperable with the primary sliding panel, and a brake mechanism cooperable with the door handle is configured to hold the primary sliding panel in place until the door handle is actuated to disengage the brake mechanism.

BRIEF DESCRIPTION OF THE DRAWINGS

These and other aspects and advantages will be described in detail with reference to the accompanying drawings, in which.

DETAILED DESCRIPTION

Figure 1:
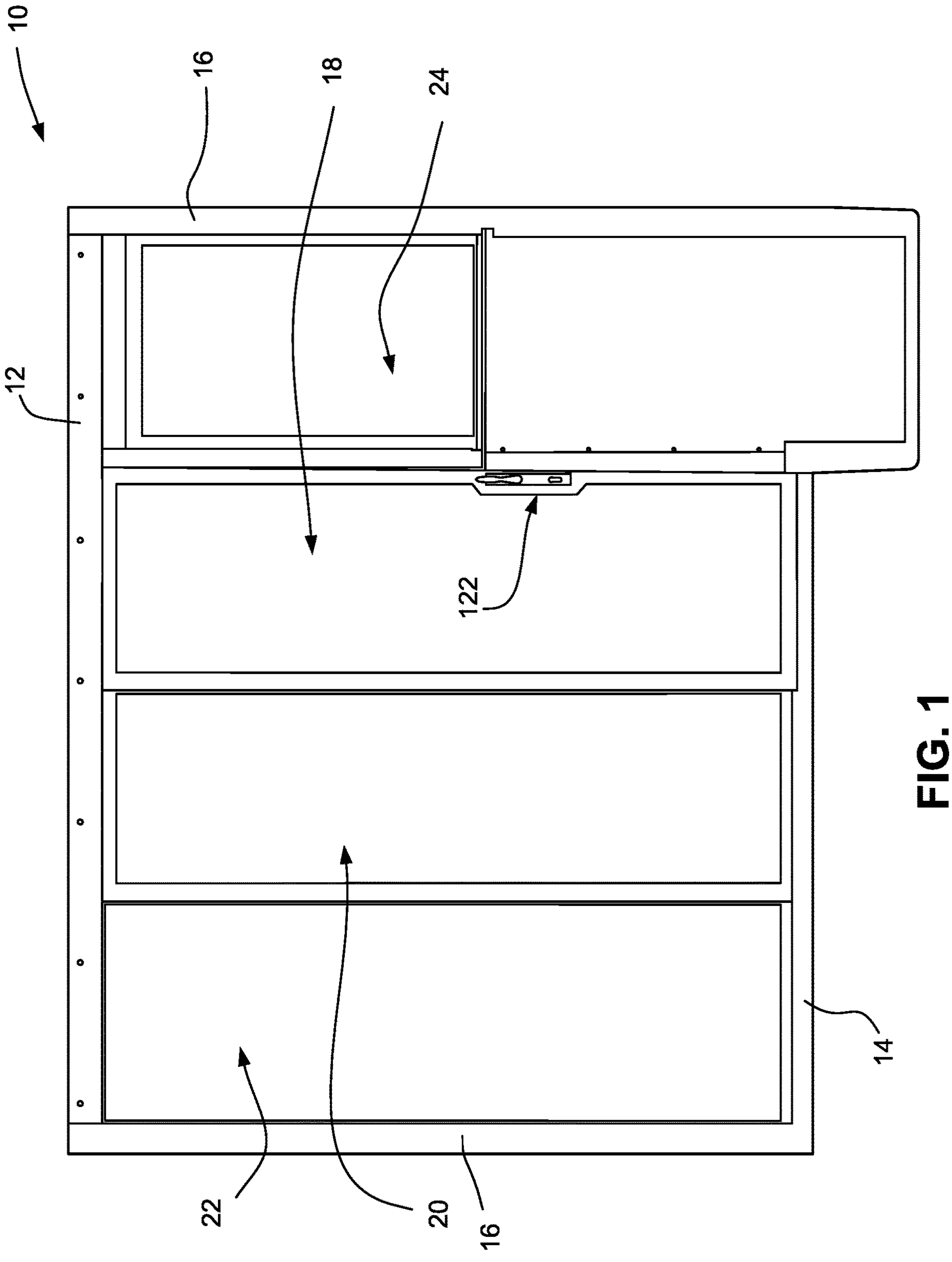
FIG. 1 shows an exemplary configuration of a sliding door assembly according to the described embodiments.

FIG. 1 shows an exemplary configuration of a sliding door assembly according to the described embodiments. Generally, the assembly 10 includes a framework with a top header 12, a bottom sill 14, and a side jamb 16. A primary sliding panel 18, a secondary sliding panel 20 and a fixed panel 22 are secured in the framework. In the exemplary embodiment shown in FIG. 1, the system also includes a drop window 24.

Figure 2:
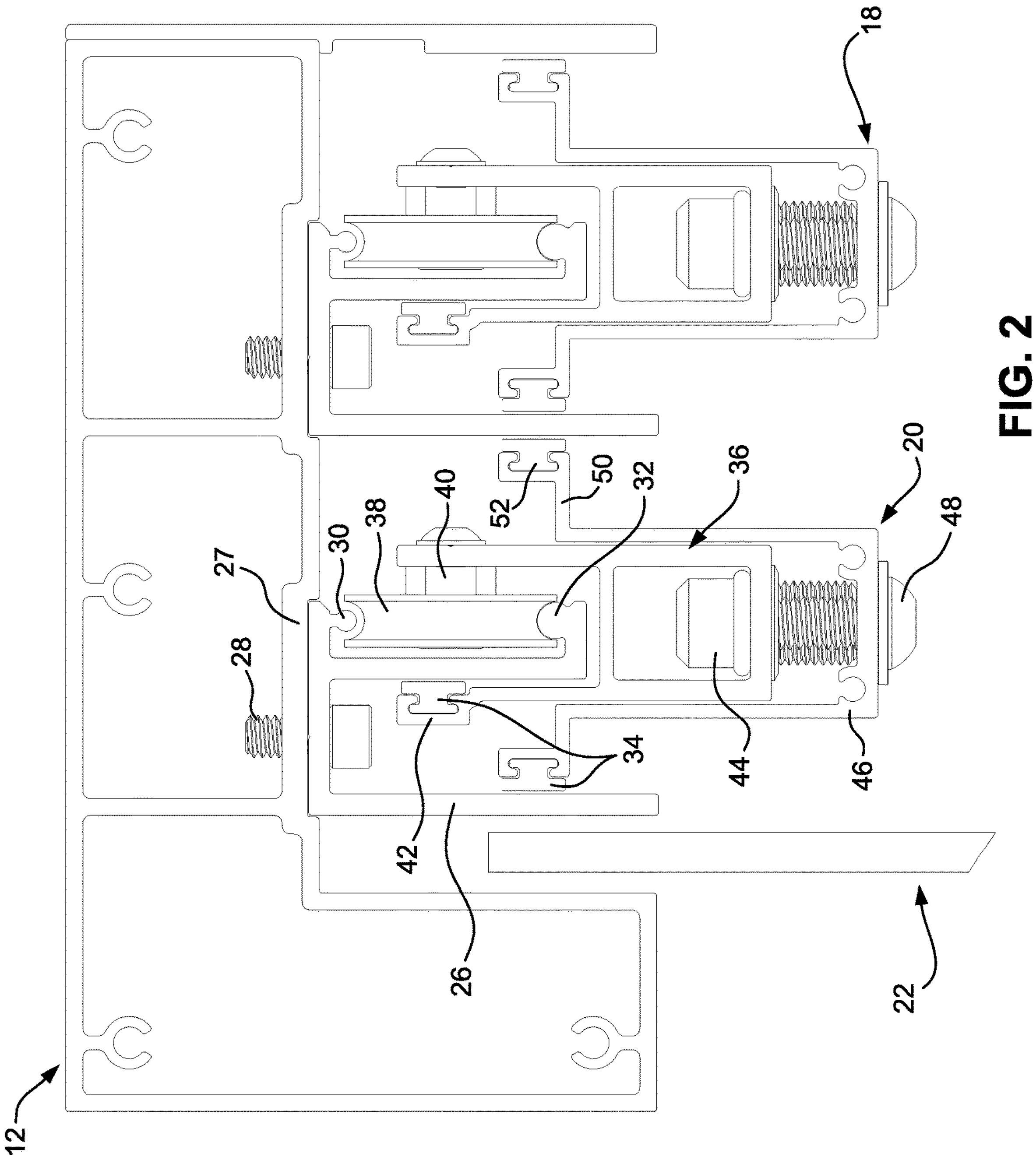
FIG. 2 is an end view of the header showing top connections to the sliding panels.

FIG. 2 is an end view of the header 12 showing top connections to the sliding panels 18, 20. The panels 18, 20 are supported by the header 12 through various connecting brackets. A rail extrusion 26 is secured to the header 12 by a plurality of bolts 28. The rail extrusion 26 includes a top rail 30 and a bottom rail 32. The rail extrusion 26 also includes one or more nylon glides and seals 34. In some embodiments, the header 12 may include recesses 27 to facilitate placement of the rail extrusions 26.

A truck 36 supports a bearing roller 38 via a hub 40. In an exemplary construction, each truck 36 supports at least two bearing rollers 38. The roller is secured between the top rail 30 and the bottom rail 32. In some embodiments, a rolling surface of the roller 38 is concave, and the bottom rail 32 is shaped in a convex complement. The upper rail 30 is slightly smaller than the lower rail 32. The complementary shapes of the roller 38 and bottom rail 32 and the position of the upper rail 30 serve to prevent the roller 38 from coming off its track. The truck 36 also includes a T-slot 42 that receives one of the nylon glides and seals 34 as shown.

A rivnut 44 extends through a bottom of the truck 36 and is connected to a top trim member 46 of each of the panels

18, 20 via a hanger bolt 48. The glass for each of the panels 18, 20 is respectively secured to each of the top trim members 46 via an adhesive. In some embodiments, the top trim members 46 are substantially U-shaped with upper flanges 50 each including a T-slot 52 for receiving the nylon glides and seals 34.

Figure 3:
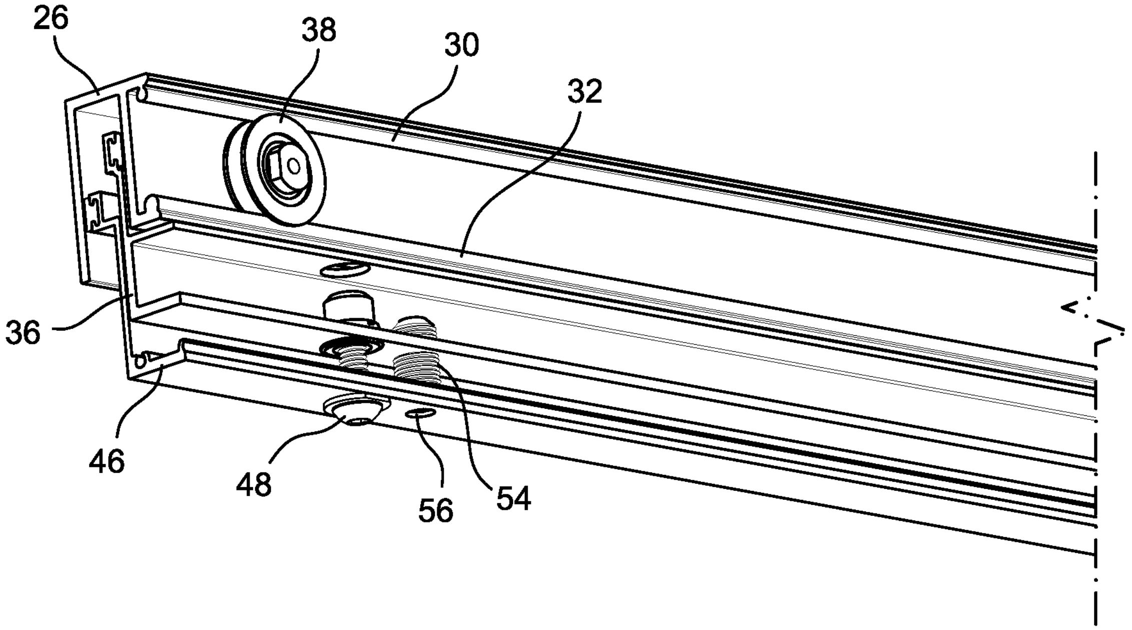
FIG. 3 is a perspective view of the sliding panel top connections.

The sliding panels 18, 20 are adjustable via the hanger bolt 48 and a jam screw 54 (FIG. 3). The jam screw 54 is threaded into the truck 36 and is accessible via a hole 56 in the top trim member 46. In order to lower the door, the hanger bolt 48 is loosened or screwed down to lower the door position, and the jam screw 54 is subsequently adjusted via the access hole 56 to connect the jam screw 54 between the truck 36 and the top trim member 46, which serves to lock the adjustment in place. In order to raise the door, the jam screw 54 is first spaced from the top trim member 46, and the hanger bolt 48 can subsequently be tightened or screwed up to raise the door until the top trim member 46 engages the jam screw 54. The hanger bolt 48 thus provides an upward force, whereas the jam screw 54 provides a downward force to stabilize the panels 18, 20. In some embodiments, the door is adjustable across a range of about 0.36 inches in either direction to accommodate for manufacturing tolerances and the like.

Figure 4:
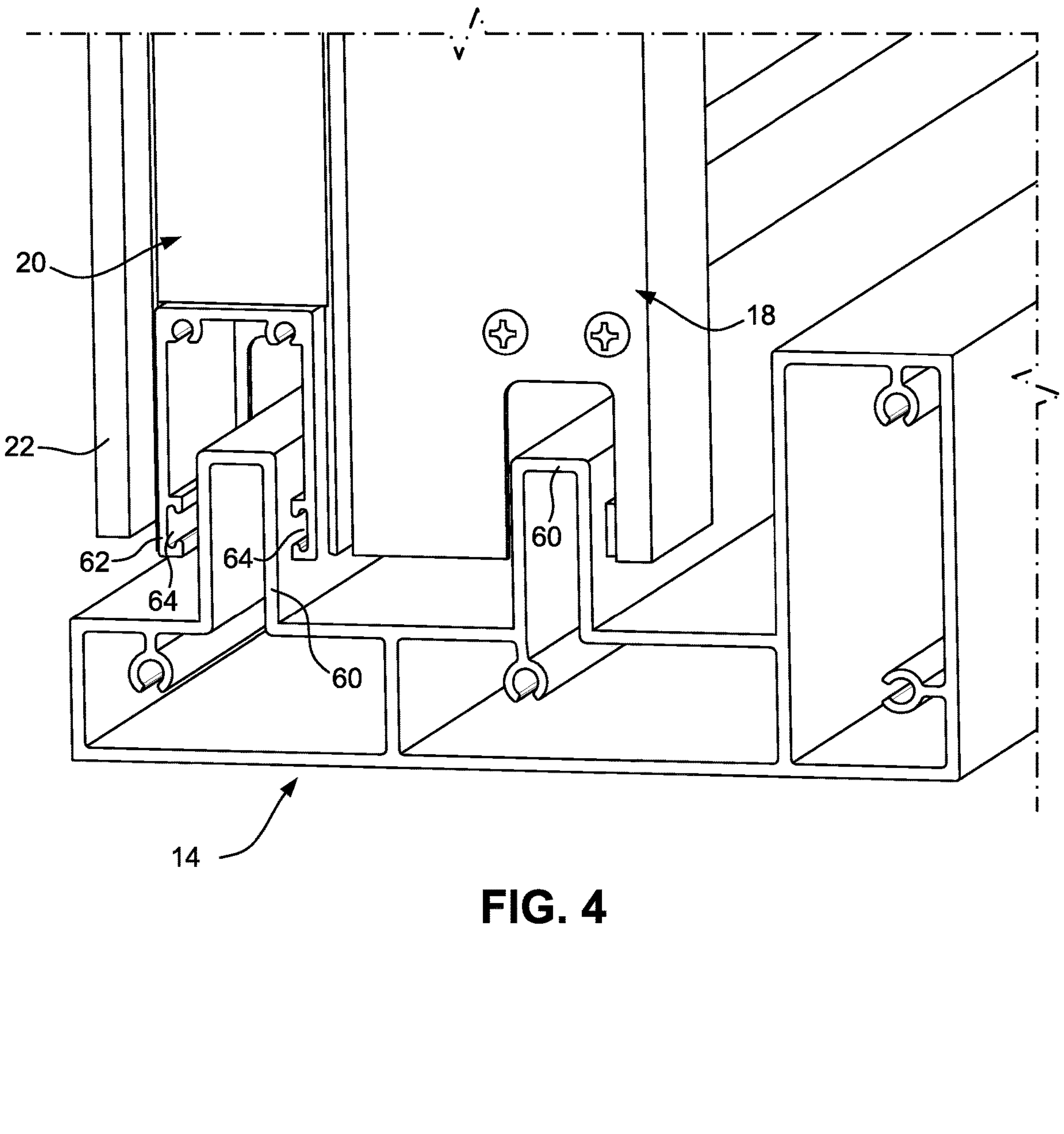
FIG. 4 shows the bottom sill of the door frame.

FIG. 4 shows the bottom sill 14 of the doorframe. The bottom sill 14 includes rails 60 over which a bottom trim member 62 is positioned for each of the sliding panels 18, 20. The T-slots 64 in the bottom trim member 62 engage nylon glides mounted on the outer sides of the rails 60. The nylon glides and T-slots facilitate smooth sliding displacement of the sliding panels 18, 20. A height of the rails 60 enables the panels 18, 20 to be vertically adjusted.

Figure 5:
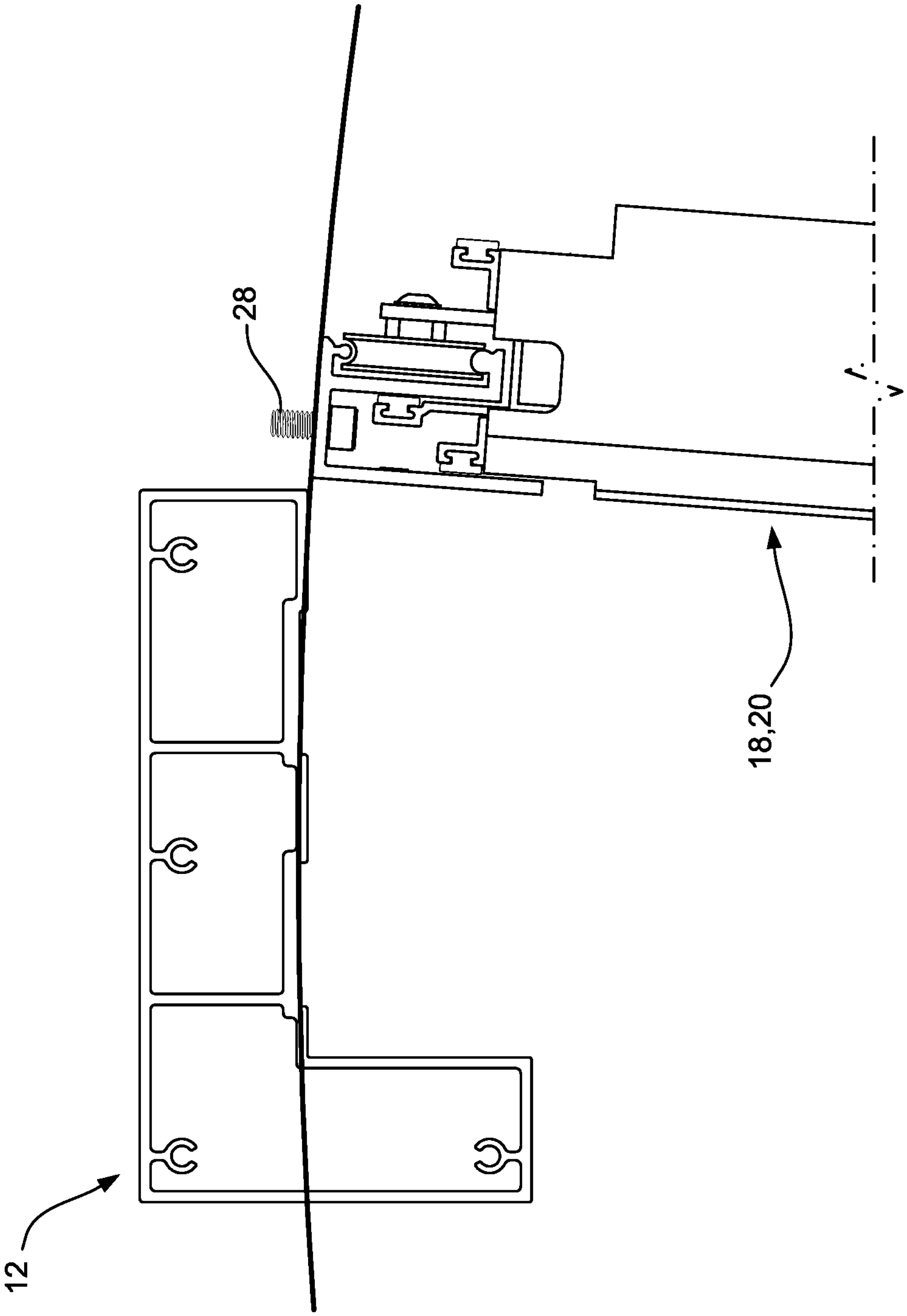
FIGS. 5 and 6 illustrate a procedure for removing the sliding panels.
Figure 6:
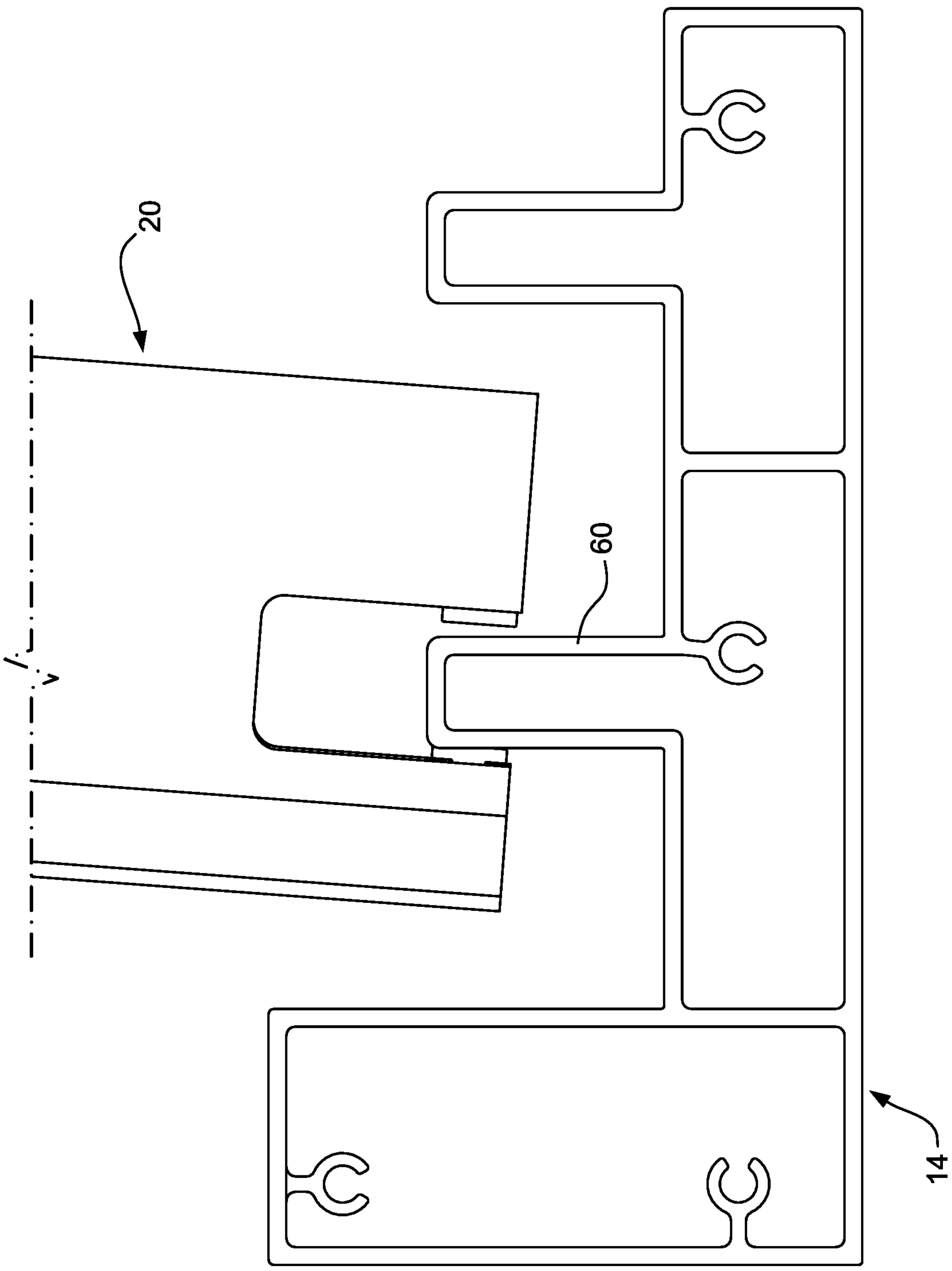
Figure 7:
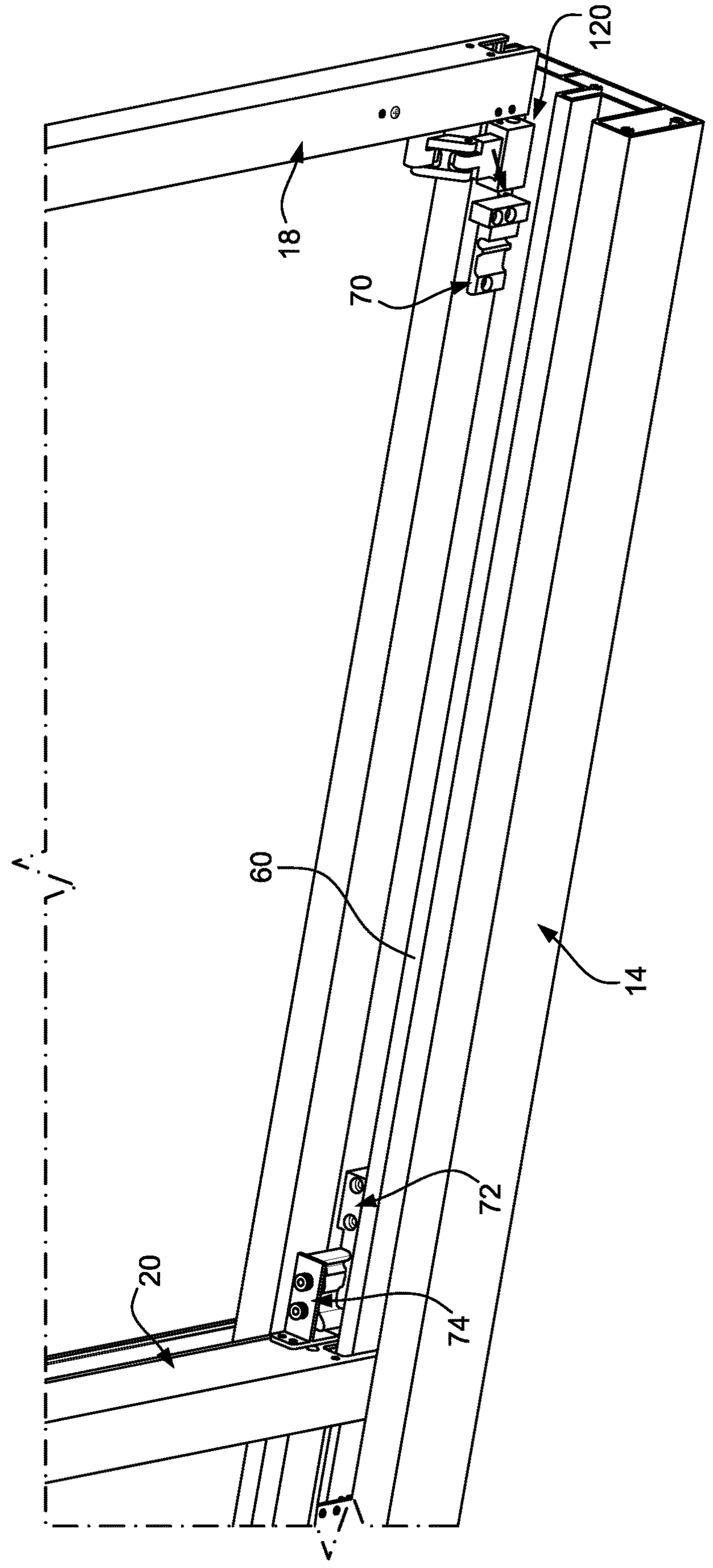
FIG. 7 shows an interlock mechanism cooperable with the door sill.

FIGS. 5 and 6 illustrate a procedure for removing the sliding panels 18, 20. As the bolts 28 are removed from the header 12, the sliding panels 18, 20 fall slightly on the rail 60, and the extrusions 26 are unseated from the recess 27 in the header 12. The sliding panels 18, 20 drop far enough onto the rail 60 to enable the entire assembly to be pivoted away from the top trim member 12 as shown in FIG. 5. Once the assembly is clear of the top trim member, the assembly can be lifted off of the rail 60 in the bottom sill 14 and removed.

Figure 8:
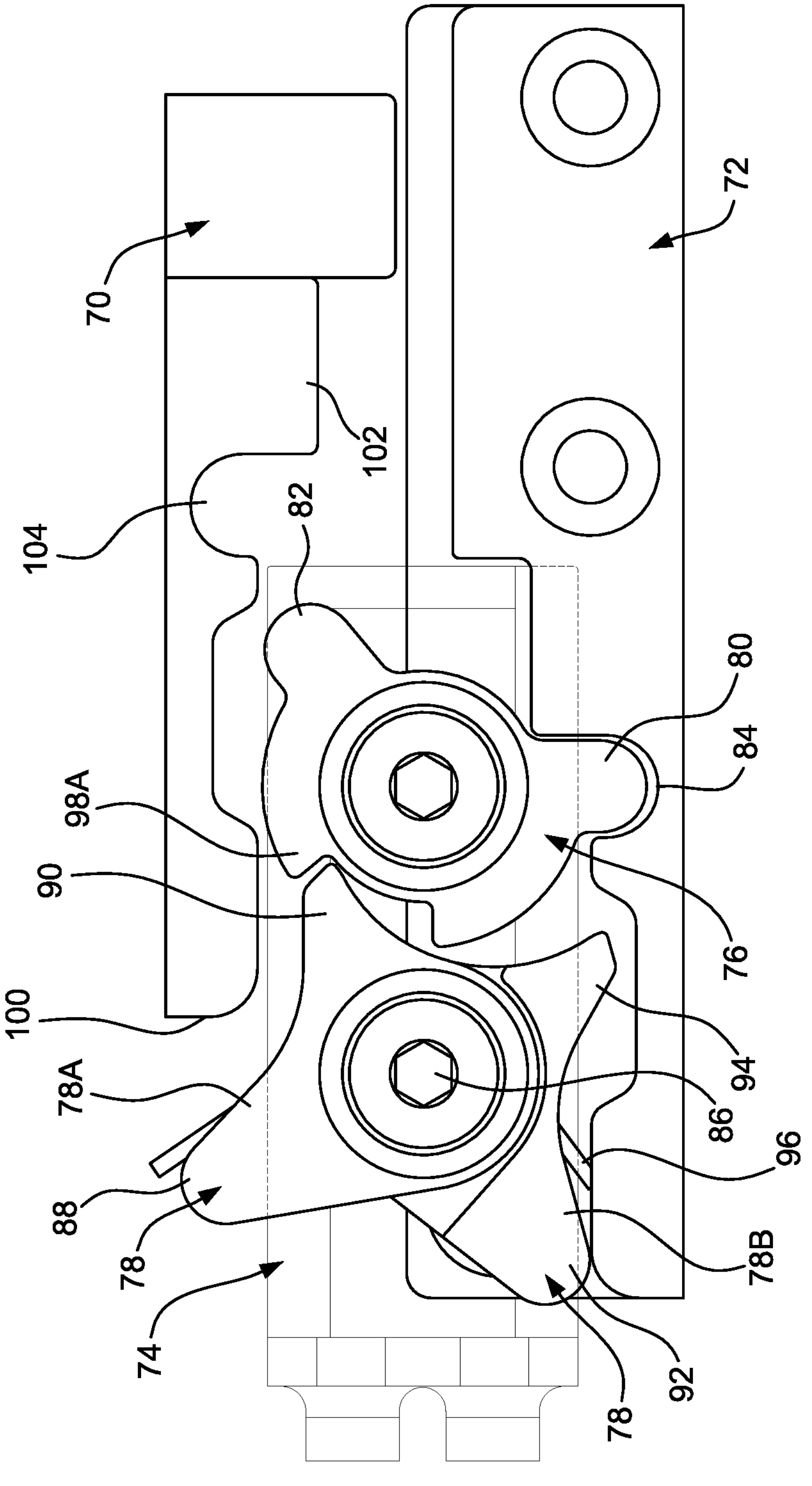
FIGS. 8-11 shows details of the interlock assembly.

An interlock mechanism will be described with reference to FIGS. 7-11. In a door assembly with multiple sliding doors, it is desirable to prevent the inside door from moving until the outermost door has reached a fully open position. Once the outermost door has reached its fully open position, it is then desirable for both doors to be displaced together. To achieve this functionality, an interlock mechanism includes a first interlock cam block 70 fixed to the outermost or primary sliding panel 18. The first interlock cam block 70 thus moves with the primary sliding panel 18. A second interlock cam block 72 is fixed to the bottom sill member 14. In the embodiment shown in FIG. 7, the second interlock cam block 72 is fixed to a side surface of the rail 60 to which the inside or secondary sliding panel 20 is engaged. The second interlock cam block 72 is thus fixed relative to the sliding panels 18, 20. An interlock assembly 74 is fixed to the secondary panel 20 and is thus displaceable with the panel 20. As shown in FIG. 8, the interlock assembly 74 includes an interlock cam 76 and a pair of interlock triggers 78. The interlock cam 76 includes a first cam tab 80 and a second cam tab 82. The interlock triggers 78 are made up of an upper part or plate 78A and a lower part or plate 78B secured on a common pivot axis 86. The upper part 78A includes a top trigger tab 88 and a lock tab 90, and the lower part 78B includes a bottom trigger tab 92 and a bottom lock tab 94. A spring 96 biases the interlock triggers 78 toward the position shown in FIG. 8.

With continued reference to FIG. 8, in the position shown, the tab 80 is engaging the recess 84, and the lock tab 90 is engaging a first lock surface 98A of the interlock cam 76. In this position, the secondary panel 20 to which the interlock assembly 74 is fixed is held in place by the engagement of the interlock assembly 74 to the second interlock cam block 72.

Figure 9:
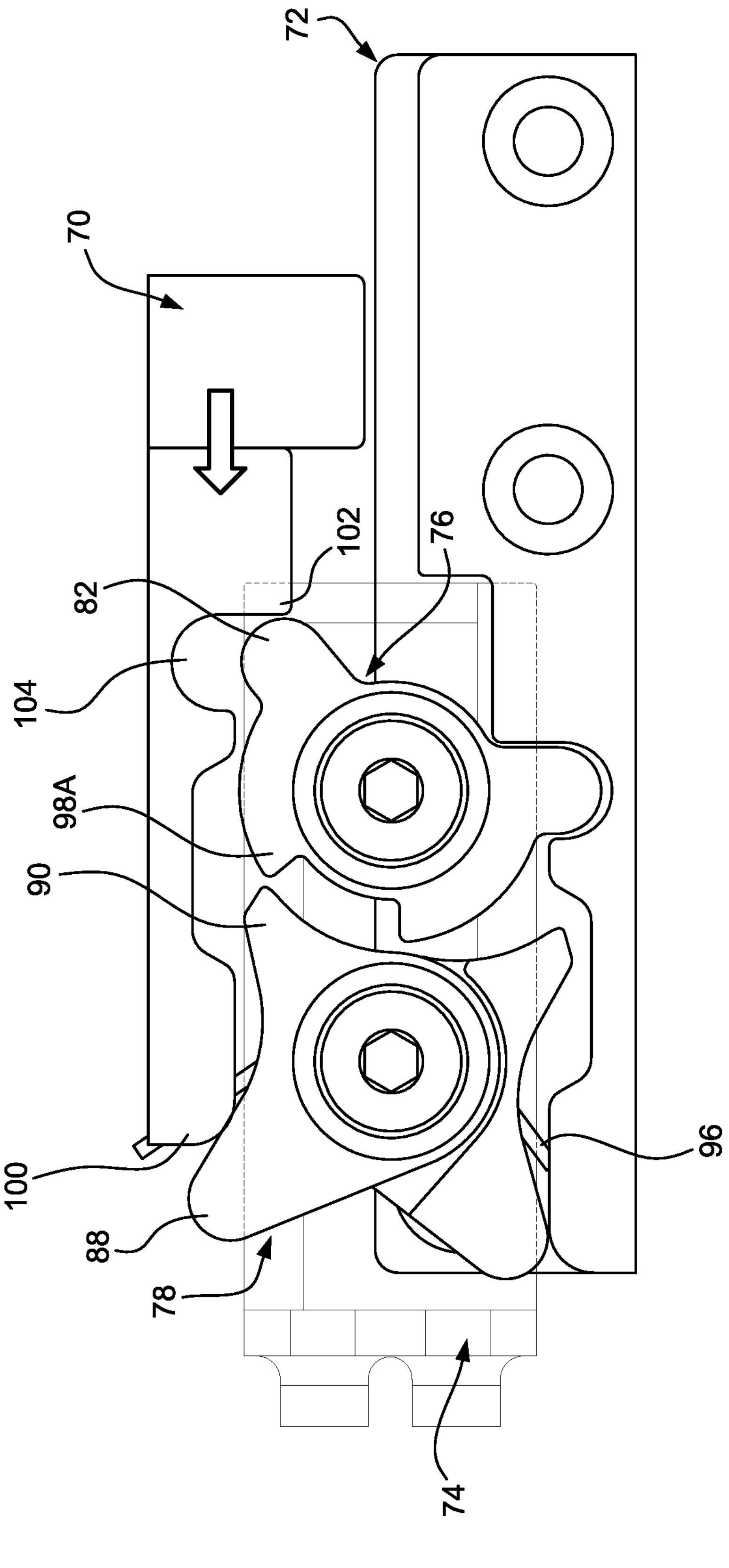
Figure 10:
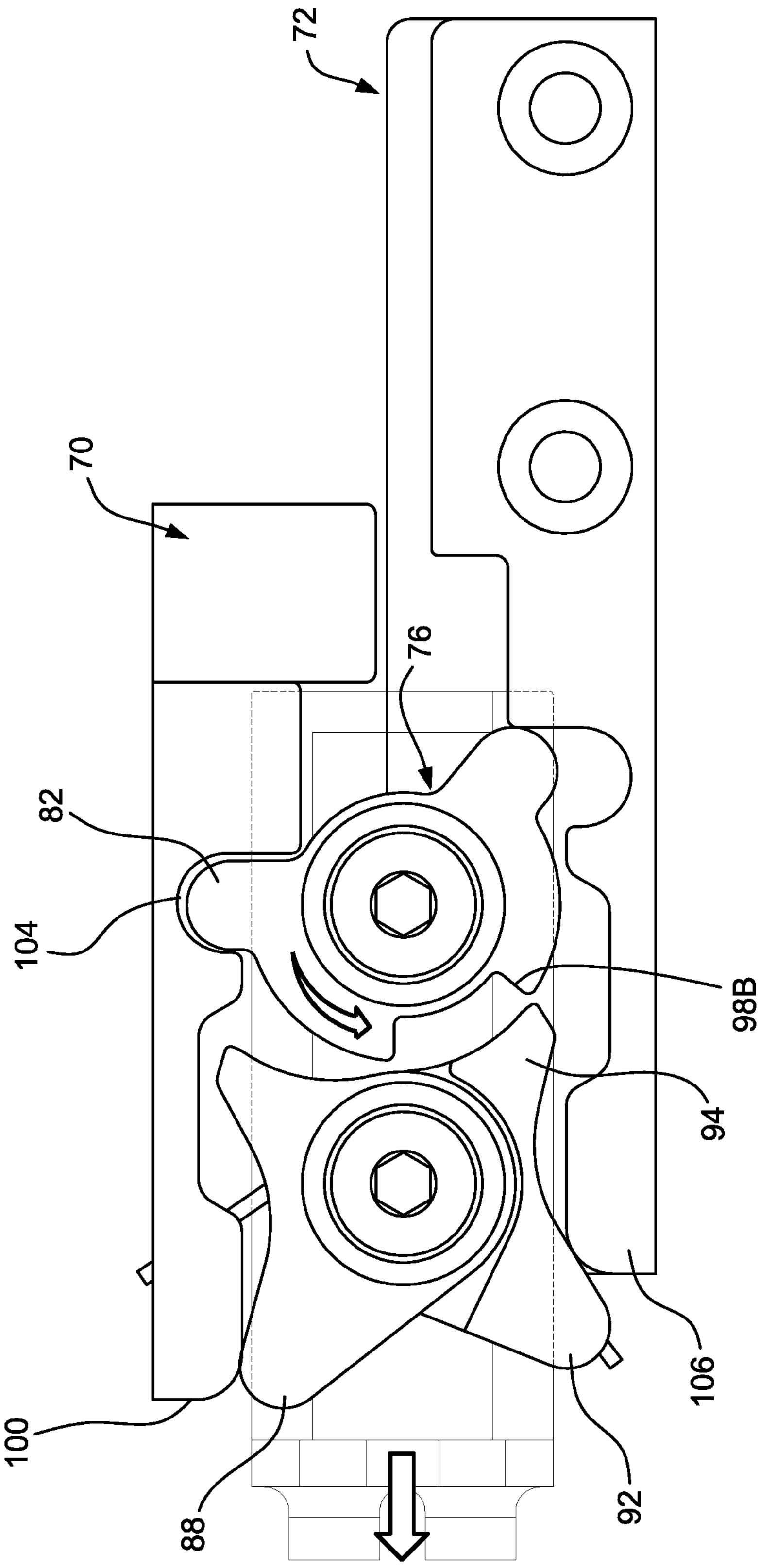
Figure 11:
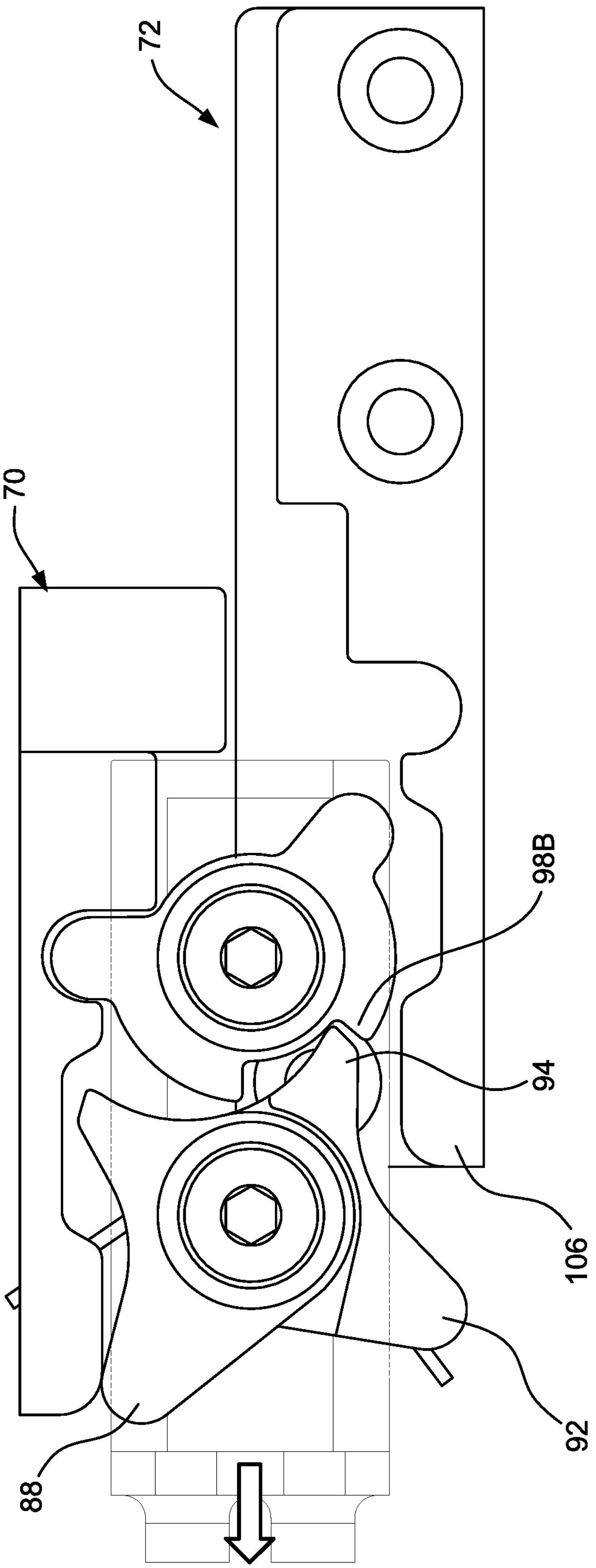

As the primary sliding panel 18 is opened, the first interlock cam block 70 approaches the interlock assembly 74. As shown in FIG. 9, a leading tab 100 of the first interlock cam block 70 engages the top tab 88 of the upper part 78A and displaces the part against the force of the spring 96 to release the lock tab 90 from the first lock surface 98A of the interlock cam 76. At about the same time, a push section 102 of the first interlock cam block 70 engages the second cam tab 82. With reference to FIG. 10, further displacement of the primary panel 18 causes the cam tab 82 to engage a recess 104 in the first interlock cam block 70. The interlock triggers function independent of each other. When the interlock cam 76 is rotated by cam block 70 so that the cam tab 82 is seated in the recess 104, the lower part 78B can rotate via force from the torsion spring 96 (counter clockwise in the FIG. 10) and cause the lock tab 94 to engage with the lock surface 98B. In a position shown in FIG. 11, the primary sliding panel 18 and the secondary sliding panel 20 are fixed together by the engagement between the interlock assembly 74 and the first interlock cam block 70. The primary and secondary panels 18, 20 can then be moved together to the maximum open position of the secondary panel 20.

A similar process works in reverse when the sliding panels 18, 20 are displaced toward a closed position. The secondary panel 20 disengages from the primary panel 18 and is re-fixed to the second interlock cam block 72, which is fixed to the sill 14. That is, from the position shown in FIG. 11, as the primary panel 18 is displaced toward the closed position (to the right in FIG. 11), a leading tab 106 of the second cam block 72 engages the tab 92 of the lower part 78B to release the lock tab 94 from the second lock surface 98B. As the first interlock cam block 70 is continued to be displaced with the primary panel 18 toward the closed position, the interlock assembly 74 re-assumes the position shown in FIG. 8, and the secondary panel 20 is subsequently fixed to the sill 14.

A brake assembly 120 is associated with the primary sliding panel 18. The brake assembly 120 is released via a handle 122 on the primary sliding panel 18 (FIG. 1) and is biased toward an engaged position such that when the handle 122 is released, the brake assembly 120 is engaged. In this manner, regardless of a position of the sliding panel 18, when the handle 122 is released, the brake 120 is engaged with the sill 14, and the sliding panel 18 is held in position.

Figure 12:
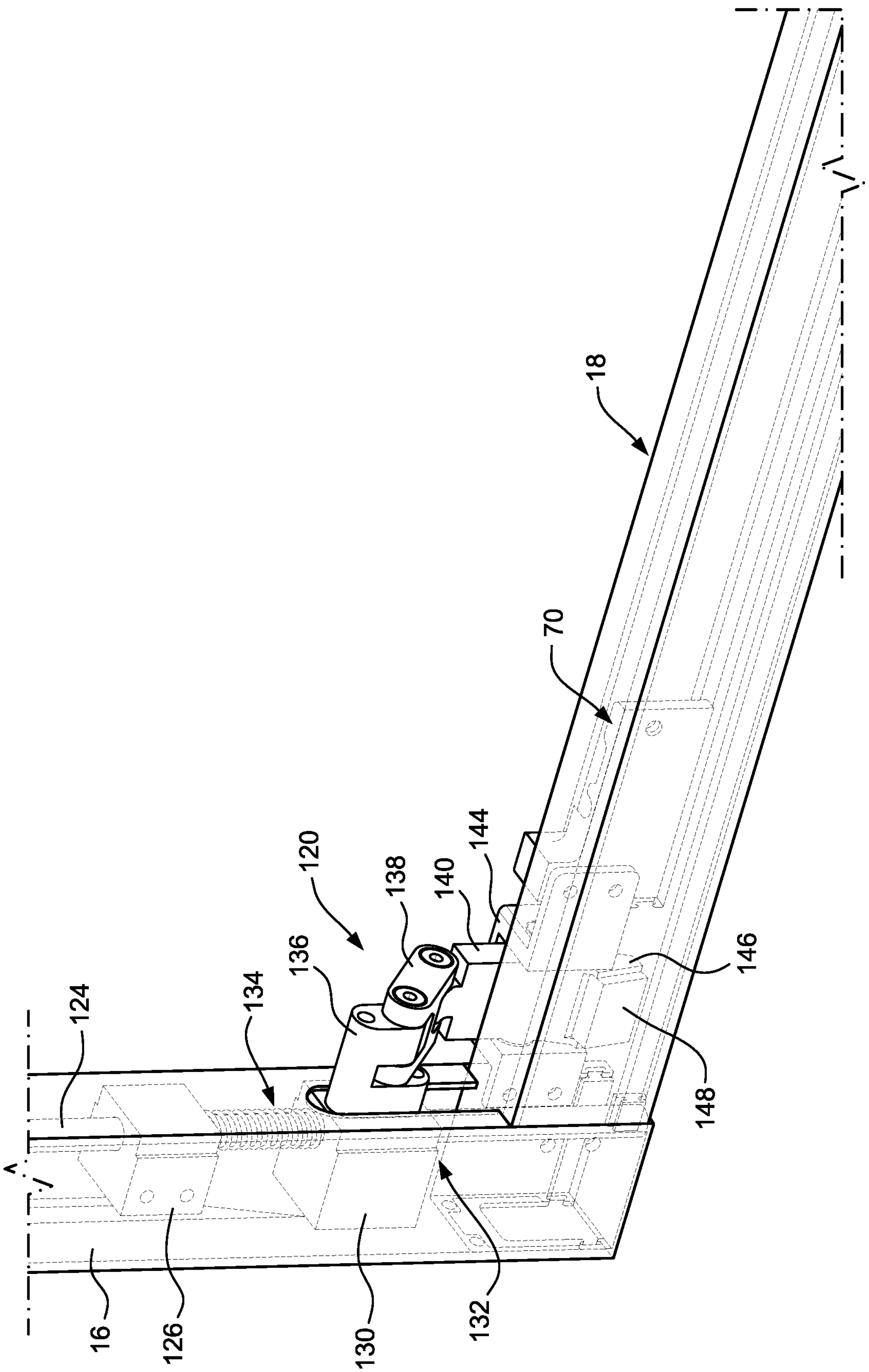
FIGS. 12 and 13 show a brake assembly associated with the primary sliding panel.
Figure 13:
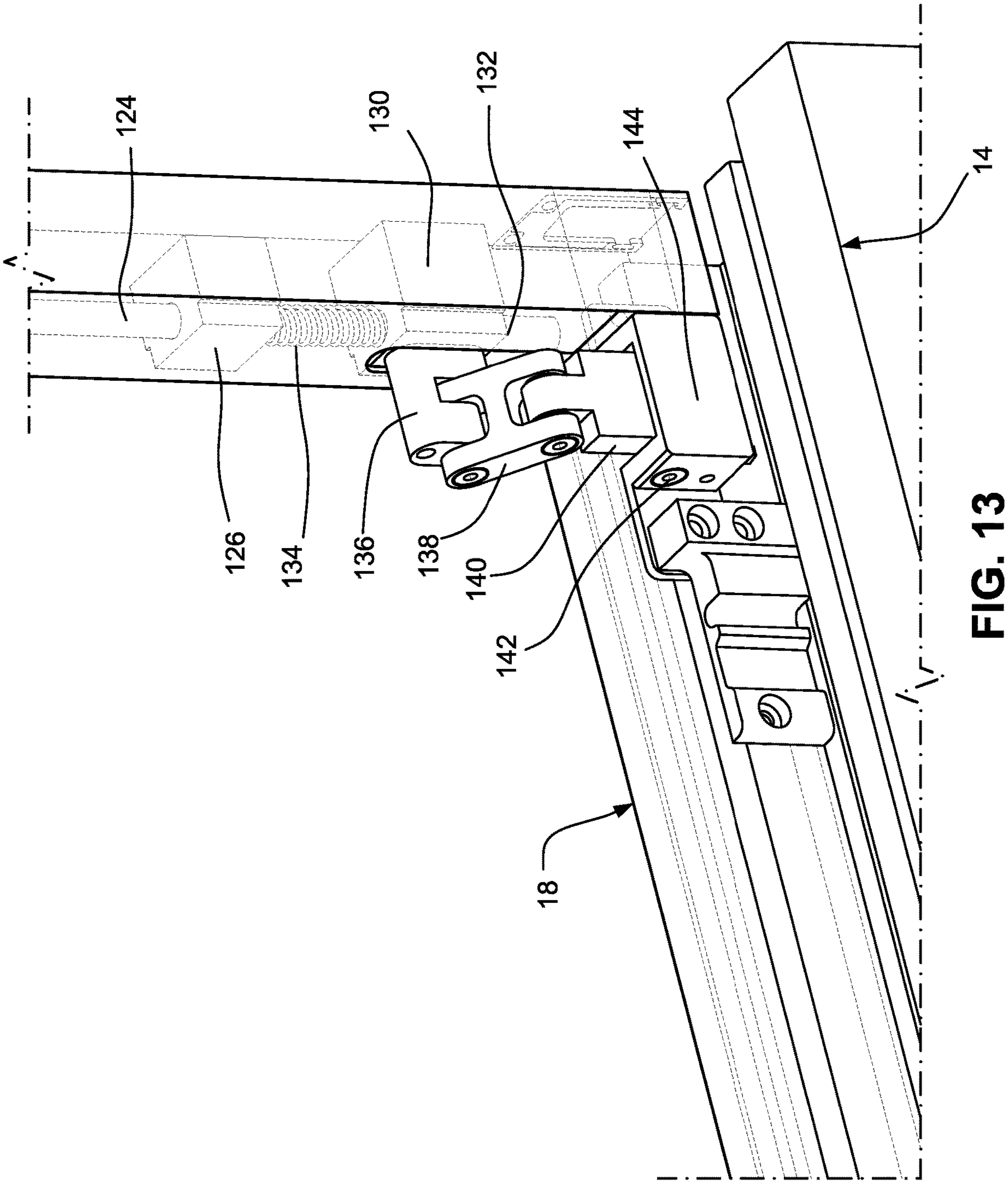

Details of an exemplary brake mechanism will be described with reference to FIGS. 12 and 13. A rod 124 is coupled with the handle 122 so that the rod 124 is displaced with the handle 122. In an exemplary construction, when the handle 122 is actuated (i.e., turned or pulled), the handle 122 displaces the rod 124 upward. The rod 124 extends through a block 126 that is fixed in place in the doorframe side jamb 16. The block 126 adds stability to the rod 124 and helps to keep the rod 124 in proper alignment.

The rod also extends through a second block 130 that is displaceable relative to the jamb 16 and the rod 124. The second block 130 sits on a collar 132 that is fixed to the rod 124. A spring 134 is disposed over the rod 124 between the first block 126 and the second block 130. The spring 134 acts on the second block 130 via the first block 126 to bias the mechanism toward an engaged position. That is, the block 126 acts as a positive stop, fixed to the door frame side jamb 16 for the spring 134 to push against.

A brake slide 136 is fixed to and displaceable with the second block 130, and an H-bar 138 is pivotably coupled at one end to the brake slide 136 and at an opposite end to a brake pivot arm 140. The brake slide 136 and the second block 130 may be constructed as one piece. The brake pivot arm 140 pivots on a pivot axis 142 (FIG. 13) defined by a pivot arm housing 144. The pivot arm housing 144 is fixed to a bottom trim member of the primary sliding panel 18.

A distal end of the brake pivot arm 140 includes a channel 146 defined by a bottom section and sidewalls as shown, and a brake pad 148 is secured in the channel 146. In some embodiments, the brake pad 148 is secured in the channel 146 via an adhesive.

In use, the spring 134 biases the brake assembly 120 to an engaged position. That is, with the handle 122 released, the spring 134 pushes against the second block 130 to displace the rod 124 downward. In the downward position, the brake slide 136 pushes the H-bar 138 down and out and pivots the brake pivot arm 140 so that the brake pad 148 engages the bottom sill 14. When the rod 124 is activated (e.g., by turning the handle 122), the rod 124 is pulled upward, and the collar 132 fixed to the rod 124 draws the second block 130 upward against the force of the spring 134. In a variation, the second block 130 could itself be fixed to the rod 124. The spring 134 is compressed by the second block 130 against the first fixed block 126. As the second block 130 is raised by the collar 132, the brake slide 136 is displaced upward, pivoting the H-bar 138 up and in to pivot the brake pivot arm 140 and thereby displace the brake pad 148 out of contact with the bottom sill 14. When the handle 122 is released, the spring 134 pushes down on the second block 130 to re-engage the brake pad 148. In this manner, regardless of a position of the door, at any time when the handle 122 is released, the brake assembly 128 is actuated to secure the primary sliding panel 18 in its current position. Of course, the brake assembly 120 could be equally functional on a door system with a single sliding panel.

Figure 14:
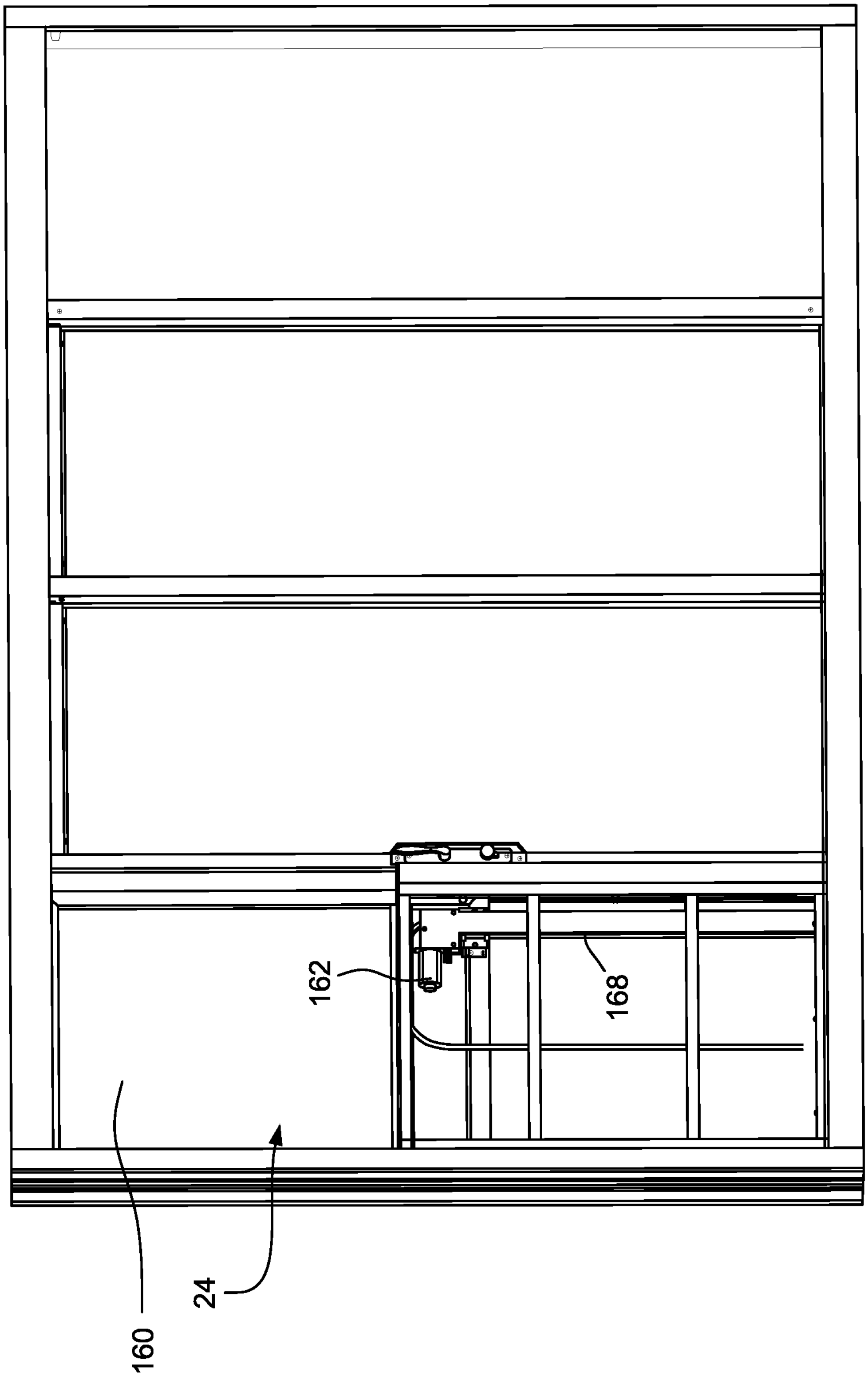
FIGS. 14-16 show an exemplary drop window included in the sliding door assembly.
Figure 15:
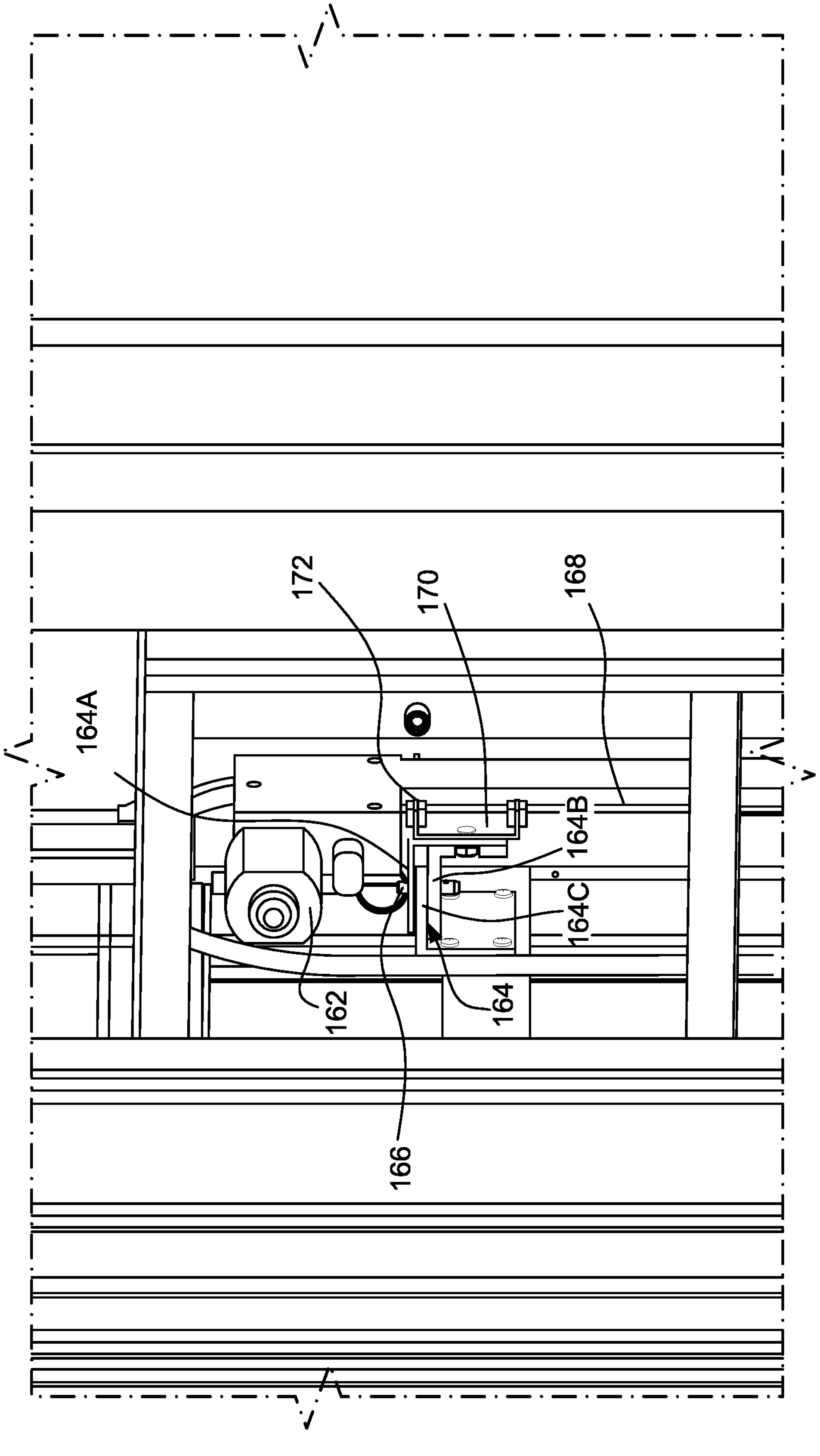
Figure 16:
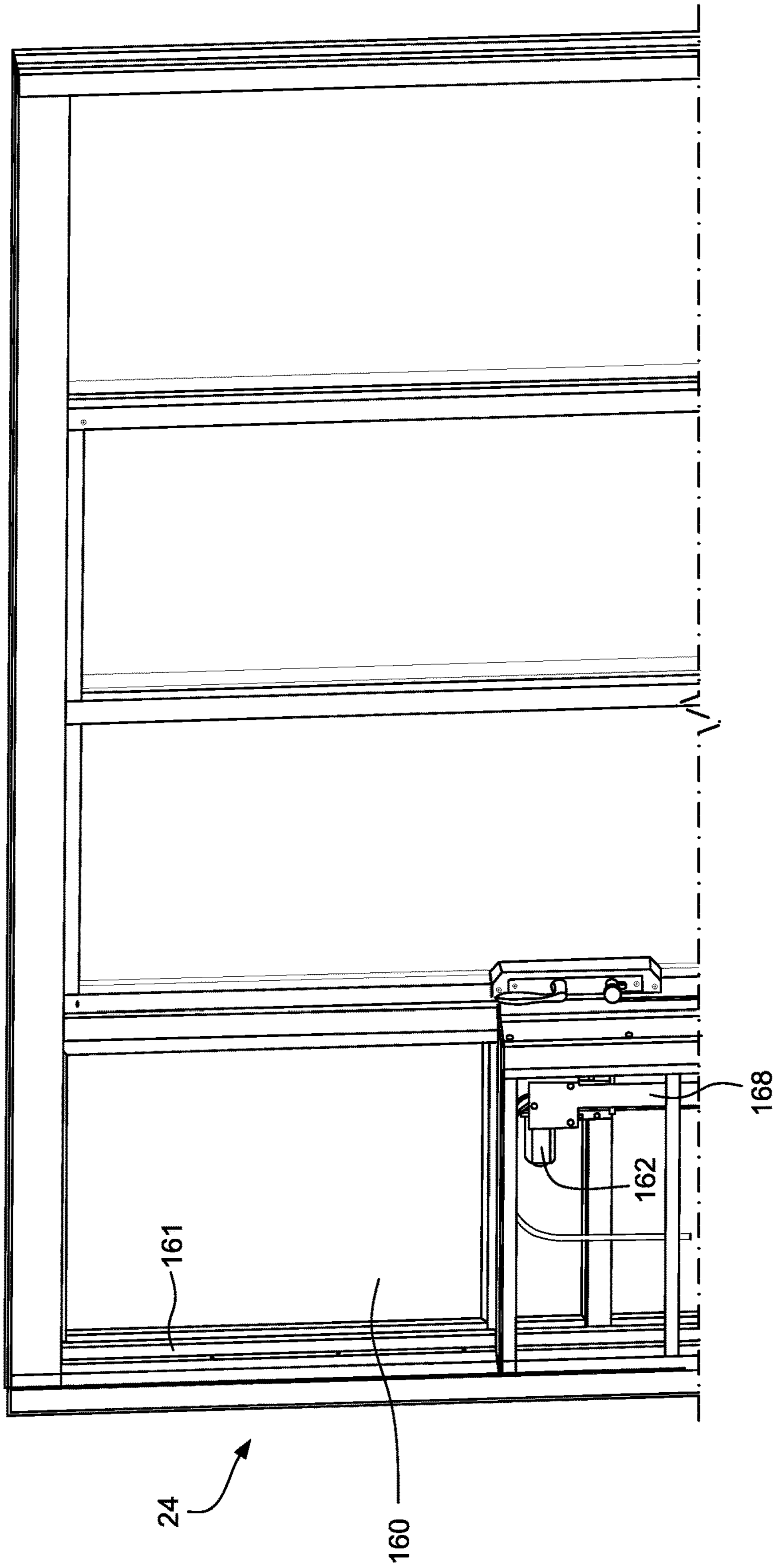

The drop window 24 will be described with reference to FIGS. 14-16. The drop window 24 includes a window panel 160 displaceable in a roller track 161 between a closed position (as shown in FIGS. 1 and 14) and an open position. A window motor 162 displaces the window panel 160. A coupling 164 connects the window motor 162 to the panel 160. The coupling 164 includes an upper plate 164A and a lower plate 164B connected to the motor and a center plate 164C connected to the window assembly. The coupling 164 is secured via a pull pin 166 or the like through the plates 164A, 164B, 164C, and the window assembly can be readily removed for replacement, maintenance or service by simply removing the pull pin 166 and the top half of the roller track 161. The window assembly can then be laterally removed from the casing (i.e., in the same direction as opening the door panels). Since the window panel is removable in the direction of the sliding doors, the window panel should be readily accessible as the door opening should be free of obstacles.

The window assembly is connected to a track 168 via a carriage 170. The coupling 164 through the pin 166 connects the window motor 162 to the carriage 170. The coupling 164 is configured to accommodate manufacturing tolerances in the frame assembly. For example, the pin 166 may be coupled through circular openings in the top plate 164A and the bottom plate 164B, and an oblong opening in the center plate 164C. Glides 172 associated with the track 168 do not allow the window to shift side-to-side, and in the event that the motor 162 is mis-mounted and/or the frame is substantially off square, the motor 162 may attempt to pull the window somewhat side-to-side. The oblong hole in the center plate 164C allows for some play as the window is raised and lowered to accommodate for these manufacturing tolerances and/or installation anomalies.

The motor 162 drives the carriage 170 via a spiral wound cable and a gear. This construction is exemplary, and other configurations for driving the window could be used.

To remove the window, the top half of the track 161 is removed, releasing the rollers. The rollers guide the window up and down and resist the rotation caused by the off-centered motor position, keeping the window going straight up and down even though there is no track or guide channel on the opposite side of the window. The lack of that guide or post leaves a cleaner more open feel to the space when the doors and window are open.

The door system of the described embodiments addresses several problems with existing constructions while also facilitating access to various moving parts for maintenance and repair. The interlock mechanism prevents a second sliding panel from being displaceable until engaging the first sliding panel in a max open position. The brake system secures the doors in place regardless of a position of the doors once the handle is released. The systems of the described embodiments are equally applicable to door assemblies including three or more sliding panels.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A sliding door assembly comprising:

a door frame including a top trim member, a bottom sill, and side jambs connected between the top trim member and the bottom sill;

a primary sliding panel secured in the door frame and slidably displaceable linearly from a closed position to a first open position and linearly from the first open position to a second open position;

a secondary sliding panel secured in the door frame and slidably displaceable linearly between the first open position and the second open position; and an interlock mechanism that locks the secondary sliding panel to the bottom sill until the primary sliding panel is displaced from the closed position to the first open position, the interlock mechanism locking the secondary sliding panel to the primary sliding panel when the primary sliding panel is displaced to and beyond the first open position to the second open position.

2. The sliding door assembly according to claim 1, wherein the interlock mechanism is configured to detach the secondary sliding panel from the primary sliding panel and re-lock the secondary sliding panel to the bottom sill when the primary sliding panel is displaced from the second open position to the first open position and beyond the first open position to the closed position.

3. The sliding door assembly according to claim 1, wherein the interlock mechanism comprises:

a first interlock cam block fixed to the primary sliding panel;

a second interlock cam block fixed to the bottom sill; and an interlock assembly fixed to the secondary sliding panel, wherein when the primary sliding panel is between the closed position and the first open position, the interlock assembly is secured to the second interlock cam block and the secondary sliding panel is fixed in place, and in the first open position, the first interlock cam block engages the interlock assembly, detaches the secondary sliding panel from the second interlock cam block, and secures the interlock assembly to the first interlock cam block.

4. The sliding door assembly according to claim 3, wherein the interlock assembly comprises an interlock cam and a pair of interlock triggers, and wherein the interlock cam comprises a first cam tab and a second cam tab, wherein one of the interlock triggers engages the interlock cam when the primary sliding panel is between the closed position and the first open position to secure the first cam tab to the second interlock cam block, and wherein the one of the interlock triggers is disposed in a path of the first interlock cam block such that in the first open position, the first interlock cam block engages the one of the interlock triggers and displaces the one of the interlock triggers from engagement with the interlock cam.

5. The sliding door assembly according to claim 4, wherein in the first open position, the second cam tab engages the first interlock cam block.

6. The sliding door assembly according to claim 4, wherein the interlock triggers comprise an upper part and a lower part secured on a common pivot axis.

7. The sliding door assembly according to claim 6, wherein the upper part comprises a top trigger tab in the path of the first interlock cam block and a lock tab that selectively engages the interlock cam.

8. The sliding door assembly according to claim 7, wherein the lower part comprises a bottom trigger tab engageable with the second interlock cam block and a bottom lock tab that selectively engages the interlock cam.

9. The sliding door assembly according to claim 8, further comprising a spring that biases the interlock triggers toward engagement with the interlock cam.

10. The sliding door assembly according to claim 1, further comprising a door handle cooperable with the primary sliding panel and a brake mechanism cooperable with the door handle, wherein the brake mechanism is configured to hold the primary sliding panel in place until the door handle is actuated to disengage the brake mechanism.

11. The sliding door assembly according to claim 10, wherein the brake mechanism is configured to re-engage when the door handle is released.

12. The sliding door assembly according to claim 10, wherein the brake mechanism comprises:

a rod coupled with the handle and displaceable with the handle;

a collar fixed to the rod and displaceable with the rod;

a moving block disposed over the rod and engaging the collar;

a brake slide fixed to the moving block and displaceable with the moving block; and a brake pad cooperable with the brake slide and displaceable by the brake slide between an engaged position and a disengaged position.

13. The sliding door assembly according to claim 12, wherein the brake mechanism further comprises:

a fixed block secured to the door frame, wherein the rod extends through the fixed block, and wherein the fixed block is positioned above the moving block; and a spring positioned between the fixed block and the moving block, the spring biasing the moving block toward a position in which the brake pad is in the engaged position.

14. The sliding door assembly according to claim 13, wherein the brake mechanism further comprises an H-bar pivotably coupled at one end to the brake slide and at an opposite end to a brake pivot arm, wherein the brake pad is fixed to the brake pivot arm.

15. The sliding door assembly comprising:

a door frame including a top trim member, a bottom sill, and side jambs connected between the top trim member and the bottom sill;

a primary sliding panel secured in the door frame;

a door handle cooperable with the primary sliding panel; and a brake mechanism cooperable with the door handle, wherein the brake mechanism is biased toward a brake engaged position by a spring to hold the primary sliding panel in place until the door handle is actuated against a bias force of the spring to disengage the brake mechanism.

16. The sliding door assembly according to claim 15, further comprising a secondary sliding panel secured in the door frame and an interlock mechanism that locks the secondary sliding panel to the bottom sill until the primary sliding panel is displaced from a closed position to a first open position.

17. The sliding door assembly according to claim 15, wherein the brake mechanism comprises:

a rod coupled with the door handle and displaceable with the door handle;

a collar fixed to the rod and displaceable with the rod;

a moving block disposed over the rod and engaging the collar;

a brake slide fixed to the moving block and displaceable with the moving block; and a brake pad cooperable with the brake slide and displaceable by the brake slide between an engaged position and a disengaged position.

18. The sliding door assembly according to claim 17, wherein the brake mechanism further comprises:

a fixed block secured to the door frame, wherein the rod extends through the fixed block, and wherein the fixed block is positioned above the moving block, wherein the spring is positioned between the fixed block and the moving block.

* * * * *